BEST AVAILABLE COPY

July 3, 1928.

Re. 17,024

F. O. FARWELL

LOUD SPEAKER

Original Filed Feb. 26, 1926

Inventor

Fay O. Farwell

By Janet F. Crampton

Attorney

BEST AVAILABLE COPY

Reissued July 3, 1928. Re. 17,024

UNITED STATES PATENT OFFICE.

FAY O. FARWELL, OF TOLEDO, OHIO.

LOUD SPEAKER.

Original No. 1,602,969, dated October 12, 1926, Serial No. 90,727, filed February 26, 1926. Application for reissue filed January 13, 1927. Serial No. 161,016.

My invention has for its object to provide a loud speaker for the amplification of the sound waves produced by the diaphragm of a receiver which is so constructed that it will reproduce more perfectly and with a more pleasing effect than is reproduced by the loud speakers now commonly known in the art.

It has been found that the higher tones, particularly, when produced staccato such as that produced by a flute, piccolo, violin or the higher tones of a piano, are reproduced more accurately by use of a speaker of the type of the ordinary bell shaped horn, but this type of speaker fails to reproduce the lower fuller tones of the piano, saxophone or cello and softer low tones of the voice or any instrument. It has also been found that a loud speaker having a large flexible diaphragm or disk, either flat or cone shape will reproduce the lower tones of the instruments and of the voice, but will not properly reproduce the higher tones as well as the bell shaped horn. By my invention I have produced a loud speaker that will reproduce both the high and low notes, and whether produced staccato or otherwise, and will soften the tones and produce a pleasing effect.

The invention may be contained in loud speakers that may be varied in their details of construction and arrangement of parts, and to illustrate a practical application of the invention, I have selected a loud speaker containing the invention as an illustration of such structures and shall describe it hereinafter. The structure selected is shown in the accompanying drawings.

Figure 1:
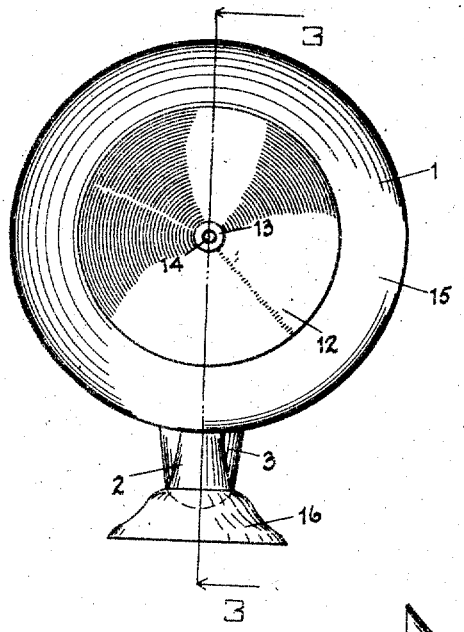
Figure 3:
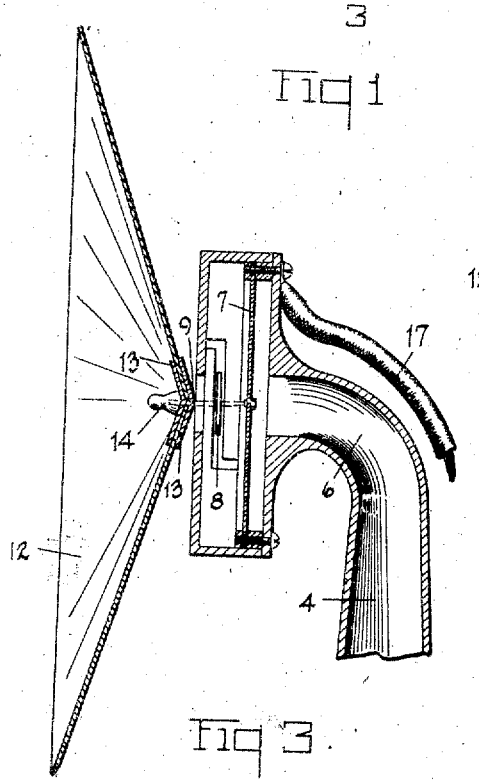
Figure 2:
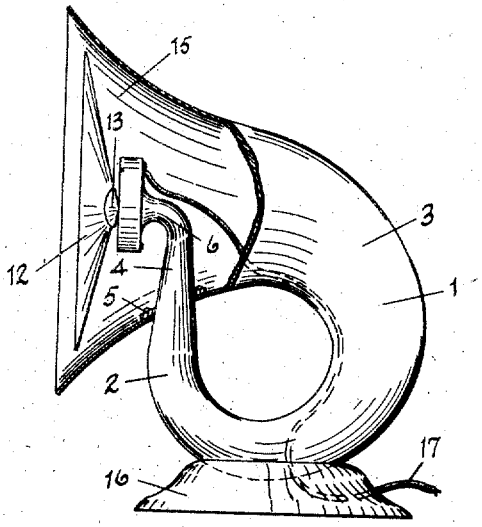

Figure 1 illustrates a front view of the loud speaker. Fig. 2 illustrates a side view of the loud speaker, a part being broken away to more clearly illustrate certain parts. Fig. 3 illustrates a section through the neck and shows some of the details of construction.

The loud speaker 1 shown in the drawings has a part that is substantially French horn shape, the tapering tube or horn 2 being curved to conform substantially to a circle and extending into the "bell" or the prominent flare of the horn. It may be made of suitable fibrous or hardened pulp of the character commonly used in such horns. For purposes of manufacture, the horn 2 may be formed of two parts 3 and 4, the part 3 constituting the body of the horn and the part 4 constituting the part located within the bell. The part 4 may be connected to a plate 5 that may be secured to the horn by any suitable means and so as to fit or form an extension of the tapering tube. The neck 6 terminates in front of the diaphragm 7 that is connected to the armature 8 which is electromagnetically actuated in the manner well known in the art to transform the electrical waves of current into sound waves.

The diaphragm 7 is connected to the armature by means of the rod 9 whereby the vibrations of the armature will be transmitted to the diaphragm 7 and the sound produced thereby magnified by the horn.

In order to produce a smooth clear tone of any pitch and to modulate the tone reproduction, I have found that by locating a somewhat soft pliable diaphragm of large diameter that such effects will be produced. As shown in the drawings, a cone shaped diaphragm 12 of comparatively stiff but thin fabric or of paper may be supported on the other end of the rod, 9. A pair of cone shaped washers 13 may be used for clamping the apex of the cone, the rod 9 being threaded at its ends and a suitable nut 14 being used for pressing the washers against the inside and outside of the apex of the cone shaped diaphragm 12. Thus the diaphragm is supported coaxially with the bell 15 of the horn.

The loud speaker may be supported on a suitable base, such as the base 16, and a connecting wire 17 for connecting the loud speaker to a radio set may pass from the receiving instrument of the loud speaker through the horn and through the base 16.

I claim:

1. In combination, a large diaphragm to produce one tone quality, a small diaphragm actuated in unison with the large diaphragm to produce sound waves, means to amplify the said sound waves to produce another tone quality in unison with the first tone quality which produces a third tone quality unlike either when produced separately the large diaphragm being directly in the path of the amplified waves produced by the smaller diaphragm.

2. In a loud speaker, a relatively small diaphragm, a relatively large diaphragm actuated in unison with the small diaphragm to produce one tone quality, the small diaphragm operating to produce sound waves and means for amplifying the sound waves to produce another tone quality the large

BEST AVAILABLE COPY diaphragm being directly in the path of the amplified waves produced by the smaller diaphragm.

3. In a loud speaker, a relatively large diaphragm, and a relatively small diaphragm, the said large diaphragm operating to produce one tone quality and means operating in unison with the large diaphragm for producing another tone quality, the said means and the large diaphragm together producing a third tone quality the large diaphragm being directly in the path of the amplified waves produced by the smaller diaphragm.

4. In a loud speaker, a horn having a bell portion and a curved tapering tube, the tapering tube terminating within the bell, an electromagnetically operated diaphragm located at the neck of the horn and means connected to the diaphragm for modulating the tones produced by the loud speaker.

5. In a loud speaker, a horn having a bell portion and a curved tapering tube, the tapering tube terminating within the bell, an electromagnetically operated diaphragm located at the neck of the horn, a flexible diaphragm of relative soft material connected to the first diaphragm.

6. In a loud speaker, a horn having a bell portion and a curved tapering tube, the tapering tube terminating within the bell, an electromagnetically operating diaphragm located at the neck of the horn, a flexible diaphragm having a relative large diameter, the center of the last named diaphragm located substantially in the axis of the bell of the horn.

7. In a loud speaker, a horn having a bell portion and a curved tapering tube, the tapering tube terminating within the bell, an electromagnetically operated diaphragm located at the neck of the horn, a flexible cone shaped diaphragm connected to the first named diaphragm and located coaxially with respect to the bell of the horn.

In testimony whereof I have hereunto signed my name to this specification.

FAY O. FARWELL.